United States Patent
Duffy et al.

(10) Patent No.: US 6,491,018 B1
(45) Date of Patent: Dec. 10, 2002

(54) METHOD AND APPARATUS FOR DELIVERING MULTIPLE FUEL INJECTIONS TO THE CYLINDER OF AN INTERNAL COMBUSTION ENGINE

(75) Inventors: Kevin P. Duffy, East Peoria; Eric C. Fluga, Dunlap; Gregory G. Hafner, Normal; Brian G. McGee, Chillicothe; Matthew R. Roth, Metamora, all of IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/961,585

(22) Filed: Sep. 24, 2001

Related U.S. Application Data

(62) Division of application No. 09/616,123, filed on Jul. 13, 2000.

(51) Int. Cl.⁷ .................................................. F02B 3/00
(52) U.S. Cl. ........................................ 123/299; 123/295
(58) Field of Search ................................ 123/299, 300, 123/305, 430, 480, 295, 490, 492, 493

(56) References Cited

U.S. PATENT DOCUMENTS

| | | | |
|---|---|---|---|
| 4,621,599 A | * 11/1986 | Igashira et al. | 123/300 |
| 5,713,328 A | 2/1998 | Anderson et al. | |
| 6,026,780 A | * 2/2000 | Barnes et al. | 123/299 |
| 6,067,954 A | * 5/2000 | Kudou et al. | 123/299 |
| 6,371,077 B1 | * 4/2002 | McGee | 123/299 |

FOREIGN PATENT DOCUMENTS

| | | |
|---|---|---|
| DE | 4414906 | 5/1995 |
| DE | 196 39 172 | 4/1998 |
| DE | 197 07 811 | 9/1998 |
| DE | 197 47 231 | 4/1999 |
| EP | 0 886 050 | 12/1998 |
| EP | 1 035 314 | 9/2000 |
| EP | 1 077 321 | 2/2001 |
| JP | 10141124 | 5/1998 |
| JP | 10274088 | 10/1998 |
| JP | 2001082151 | 3/2001 |
| WO | WO 96/03578 | 2/1996 |

\* cited by examiner

*Primary Examiner*—Willis R. Wolfe
*Assistant Examiner*—Mahmoud Gimie

(57) ABSTRACT

A fuel injection control system and method for delivering multiple fuel injections to a cylinder of an engine during a fuel injection event based upon engine operating conditions, the control system including an electronic controller coupled to an electronically controlled fuel injector, and a plurality of sensors coupled to the controller for inputting certain signals representative of certain engine operating conditions of the engine, the controller being operable to output a fuel injection signal to the fuel injector to deliver a first, a second, and a third fuel shot to the cylinder during a fuel injection event based upon the sensor signals. The controller also delivers each of the multiple fuel injection shots within defined cylinder piston displacement parameters during a particular piston stroke, within defined fuel apportionment limits, and within defined delay limits between each respective fuel shot so as to control exhaust emissions.

21 Claims, 5 Drawing Sheets

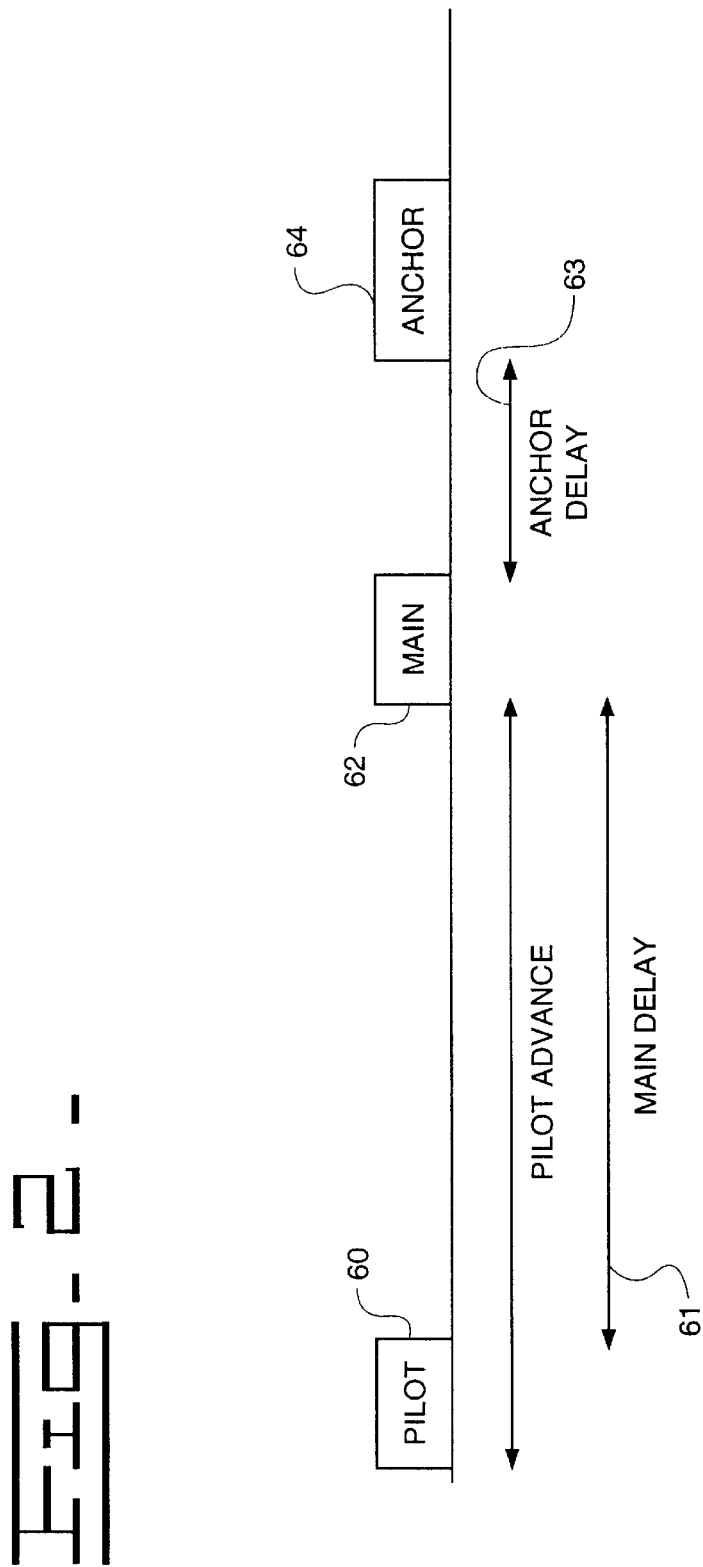

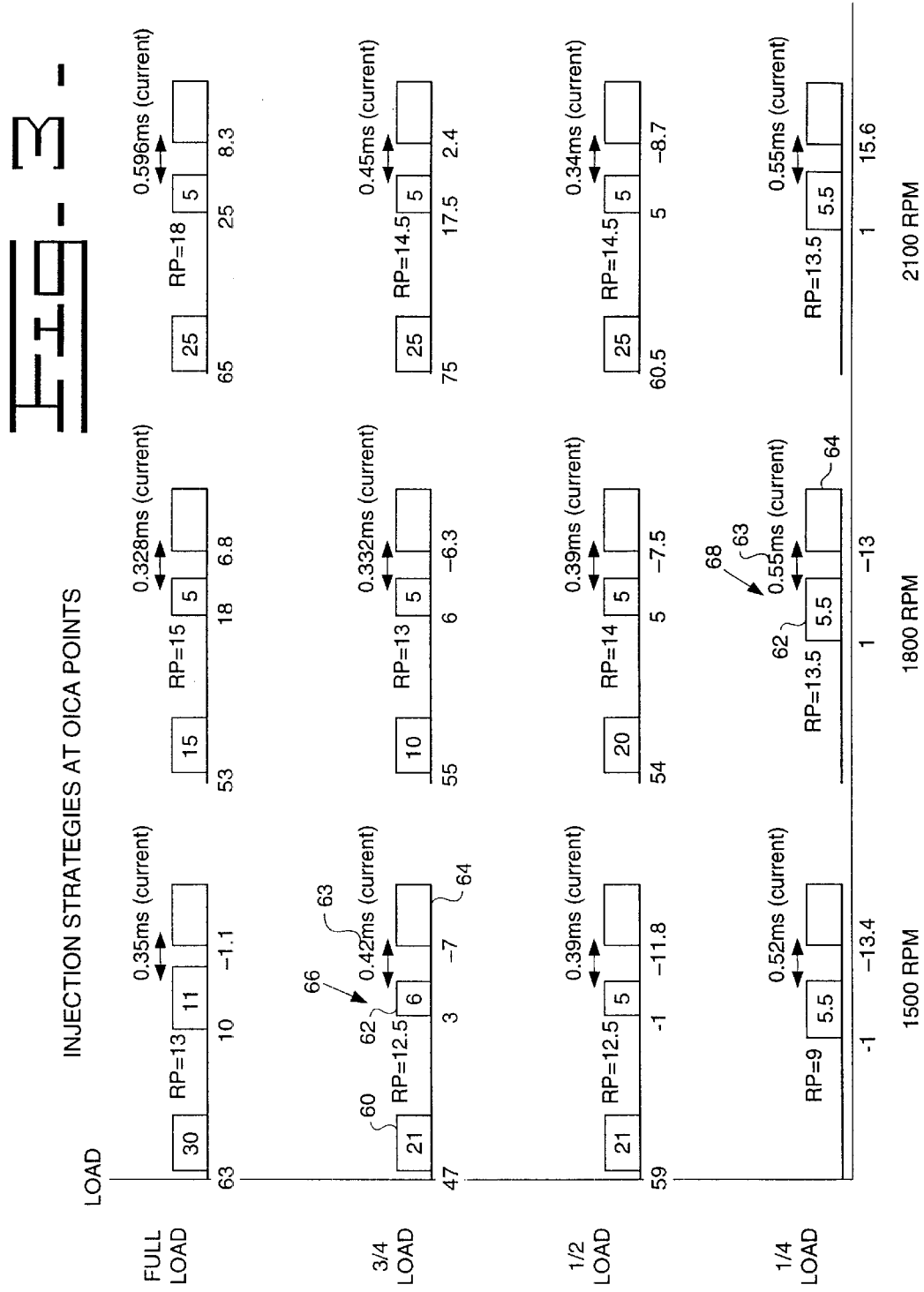

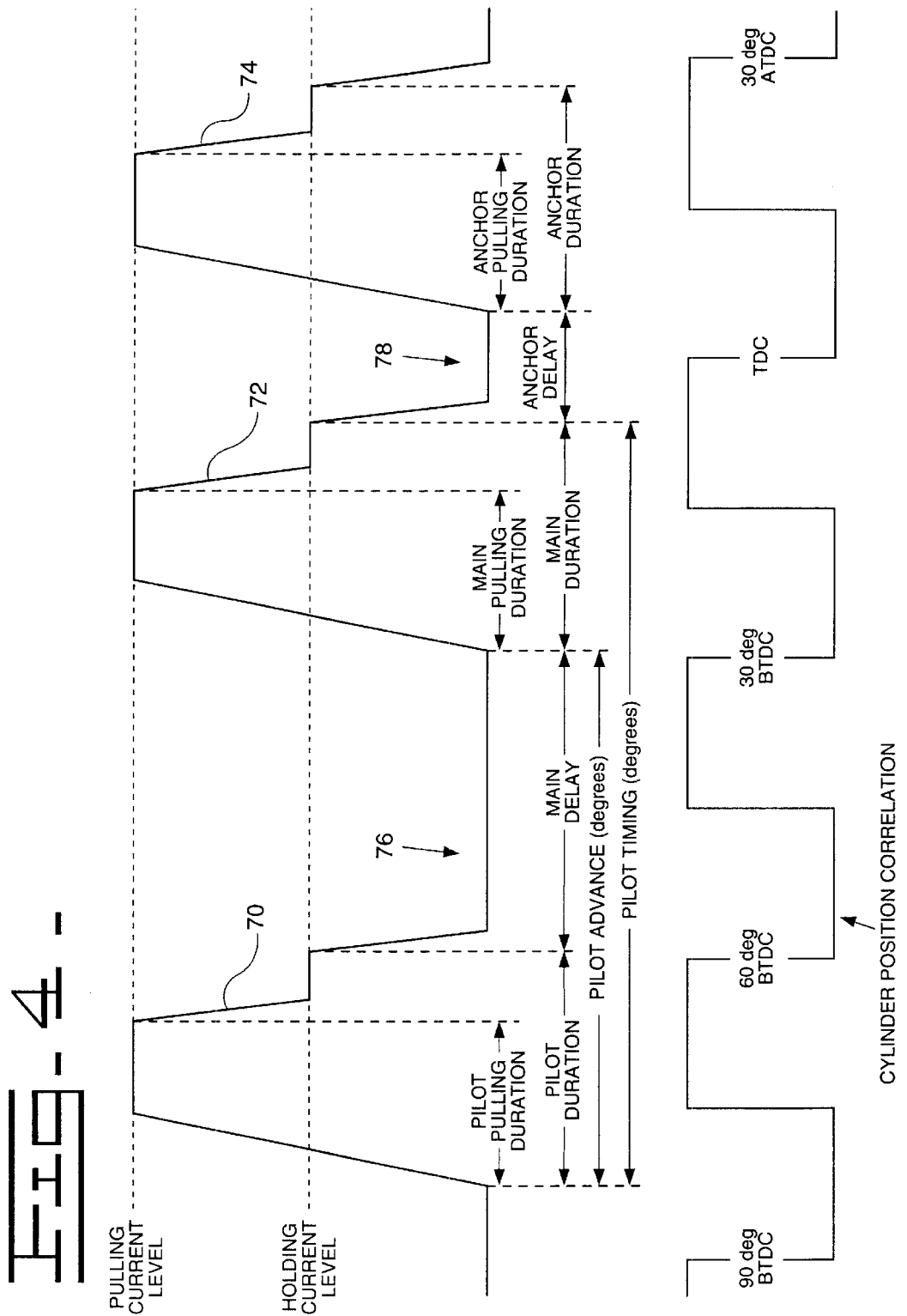

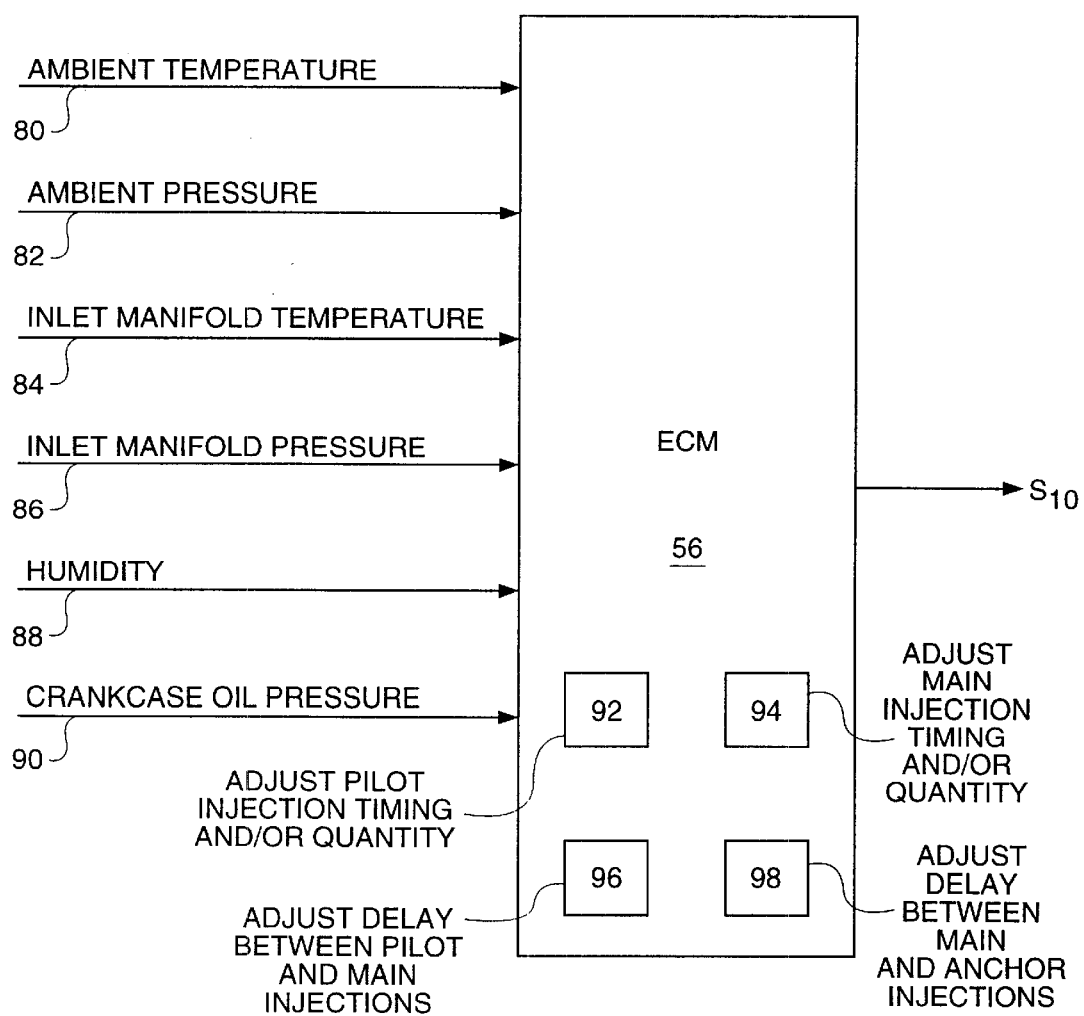

METHOD AND APPARATUS FOR DELIVERING MULTIPLE FUEL INJECTIONS TO THE CYLINDER OF AN INTERNAL COMBUSTION ENGINE

This application is a division of Ser. No. 09/616,123, filed Jul. 13, 2000.

TECHNICAL FIELD

This invention relates generally to electronically controlled fuel injection systems and, more particularly, to a method and apparatus for delivering multiple fuel injections to the cylinder of an internal combustion engine during a fuel injection event based upon engine operating conditions.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate as well as the desired timing and quantity of fuel to be injected into the cylinders.

Emission regulations pertaining to engine exhaust emissions are becoming more restrictive throughout the world including, for example, restrictions on the emission of hydrocarbons, carbon monoxide, the release of particulates, and the release of nitrogen oxides ($NO_x$). Tailoring the number of injections and the injection rate of fuel to a combustion chamber, as well as the quantity and timing of such fuel injections, is one way in which to control emissions and meet such emission standards. As a result, split fuel injection techniques have been utilized to modify the burn characteristics of the combustion process in an attempt to reduce emission and noise levels. Split injection typically involves splitting the total fuel delivery to the cylinder during a particular injection event into two separate fuel injections such as a pilot injection and a main injection. At different engine operating conditions, it may be necessary to use different injection strategies in order to achieve both desired engine operation and emissions control. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine.

In the past, the controllability of split injections has been somewhat restricted by mechanical and other limitations associated with the particular types of injectors utilized. In addition, in some embodiments, such as disclosed in the patent U.S. Pat. No. 5,740,775, the total fuel quantity associated with a split injection is apportioned such that approximately 50% of the fuel is associated with the first fuel shot and approximately 50% of the fuel is associated with the second-fuel shot. Under the more restrictive emissions regulations of today, this fuel partitioning strategy yields higher than desirable hydrocarbons and excessive fuel dilution of the oil. Even with more advanced electronically controlled injectors, during certain engine operating conditions, it is sometimes difficult to accurately control fuel delivery, even when utilizing current control signals.

In addition, some spark ignited engines incorporate split injection fuel strategies, such as disclosed in the patent U.S. Pat. No. 5,609,131. However, in order to achieve desired ignition timing utilizing a spark or glow plug, these engines are restricted in the manner of fuel distribution among the shots, thereby reducing their effectiveness with regard to reducing engine emissions.

Desired engine performance is not always achieved at all engine speeds and engine load conditions using the previously known fuel injection strategies. Based upon engine operating conditions, the injection timing, fuel flow rate and the injected fuel volume are desirably optimized in order to achieve minimum emissions and desired fuel consumption. This is not always achieved in a split injection system due to a variety of reasons, including limitations on the different types of achievable injection waveform types, the amount of fuel injected during the pilot shot, when the two injections take place during the particular injection event, and the timing sequence between the two injections. As a result, problems such as injecting fuel at a rate or time other than desired within a given injection event and/or allowing fuel to be injected beyond a desired stopping point can adversely affect emission outputs and fuel economy.

It is therefore desirable to control and deliver any number of separate fuel injections to a particular cylinder including three or more fuel shots so as to minimize emissions and fuel consumption based upon the operating conditions of the engine at that particular point in time. This may include splitting the fuel injection into more than two separate fuel shots during a particular injection event, providing a specific fuel quantity relationship between the respective fuel shots in a particular injection event based upon the number of fuel shots associated therewith, advancing the pilot shot during the compression stroke, delivering the respective fuel shots within defined crank angle or cylinder piston displacement limits, and adjusting the timing between the various multiple fuel injections in order to achieve desired emissions and fuel consumption. In some situations, it is also desirable to rate shape the front end of the fuel delivery to the cylinder to control the burn characteristics of the particular fuel being utilized and, in other situations, it may be desirable to rate shape the tail end of the fuel delivery to the cylinder to achieve desired emissions control and engine performance.

Accordingly, the present invention is directed to overcoming one or more of the problems as set forth above.

DISCLOSURE OF THE INVENTION

In one aspect of the present invention there is disclosed an electronically controlled fuel injection system which is capable of delivering multiple fuel injections to a particular cylinder of an internal combustion engine during a single injection event. The present system includes means for variably providing multiple separate fuel injections or fuel shots during a fuel injection event depending upon the operating conditions of the engine including engine speed and engine load. In this regard, in one embodiment, fuel is apportioned between a first or pilot shot, a second or main shot, and a third or anchor shot, each separate fuel injection shot being delivered when the cylinder piston is located within a determined range during a particular piston stroke. In another embodiment, fuel is apportioned between the multiple fuel shots in accordance with a specific fuel quantity relationship. The present system also includes means for varying the timing and fuel quantity associated with each fuel injection as well as the time interval between the various fuel injection shots based upon the operating conditions of the engine.

Under certain operating conditions, the proximity of the main and anchor shots and the resultant internal injector hydraulics leads to a rate shaping effect of the third or anchor injection. As a result, although the first or pilot injection, when used, is typically a distinct injection as compared to the second and third injections, a distinct third injection is not always apparent. Depending upon such factors as ambient operating conditions, engine speed, engine load, desired engine performance, desired emissions, and still other factors, in certain situations, a split mode of operation between the second and third injections may be advantageous whereas in other situations a rate shaping effect or boot mode of operation between the second and third injections may be advantageous.

These and other aspects and advantages of the present invention will become apparent upon reading the detailed description in connection with the drawings and appended claims.

BRIEF DESCRIPTION OF THE DRAWINGS

For a better understanding of the present invention, reference may be made to the accompanying drawings in which:

FIG. 2 is a schematic profile of a three shot fuel injection event;

FIG. 3 is a chart illustrating an example of the injection strategies for steady state emissions taken at certain engine operating conditions based upon engine speed and engine load;

FIG. 4 is a schematic diagram of an exemplary current waveform for a three shot injection event; and FIG. 5 is an exemplary schematic illustration of one embodiment of a control system for adjusting the parameters of a fuel injection event based upon ambient conditions.

BEST MODE FOR CARRYING OUT THE INVENTION

Figure 1:
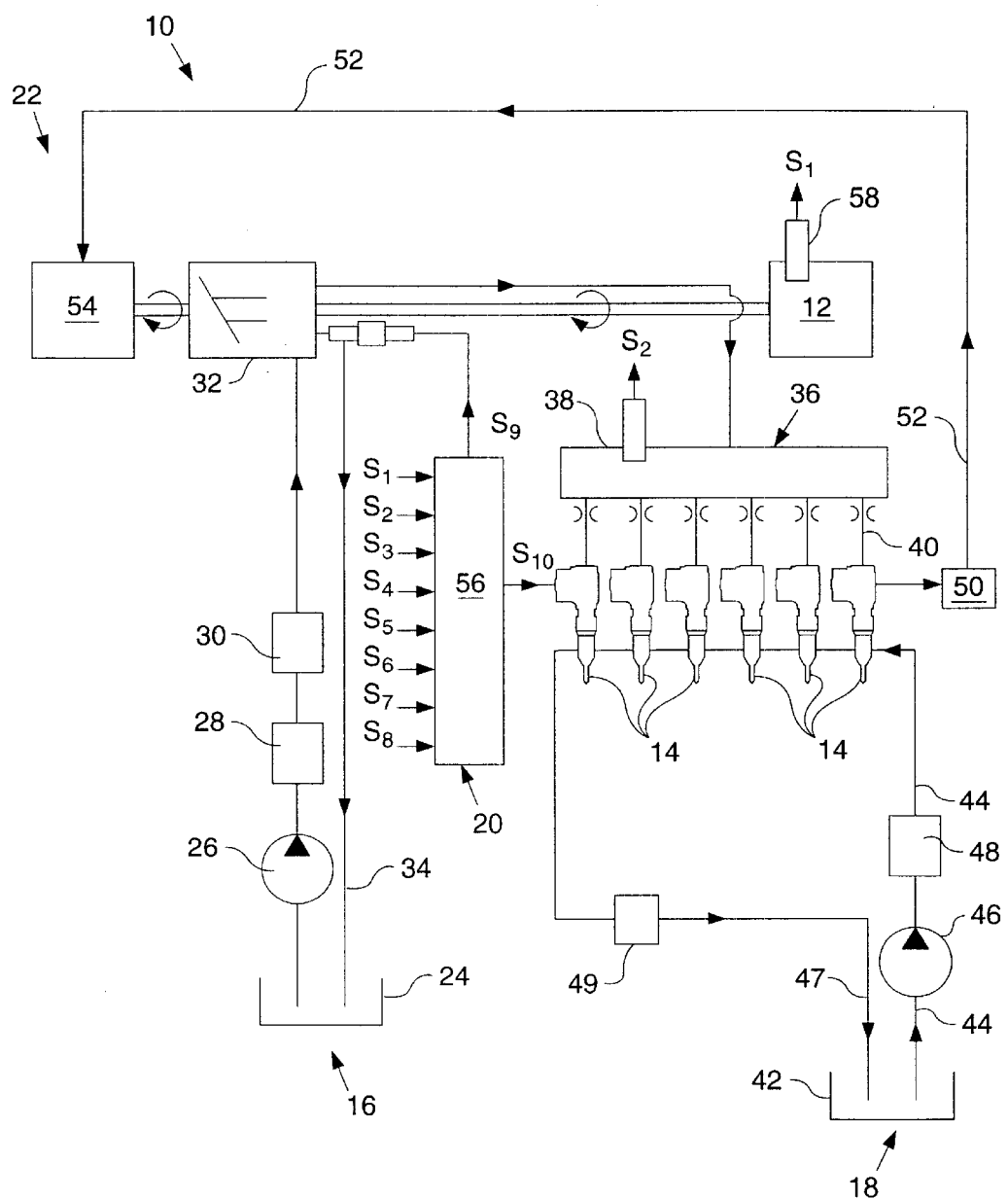
FIG. 1 is a typical schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12, preferably having a fixed compression ratio. The present invention applies to direct-injection compression ignition engines capable of running at any engine speeds, including low, medium, high, and very high engine speeds. Very high engine speeds includes engines running at 4000 rpm and above. Fuel system 10 includes one or more electronically controlled fuel injection devices, illustrated as fuel injectors 14 in this embodiment, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices, including electronically controlled injectors, and mechanically actuated electronically controlled injector units as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of liquid.

In the illustrated embodiment, the fuel supply means 18 includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42. In an alternative embodiment, the fuel supply means 18 may vary to support the needs of different fuel injection devices, such as digitally controlled fuel valves.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

It is recognized that the type of fuel injection desired during any particular fuel injection event will typically vary depending upon various engine operating conditions. In an effort to improve emissions, it has been found that delivering multiple fuel injections to a particular cylinder during a fuel injection event at certain engine operating conditions achieves both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some determined time factor, crank angle or main delay 61, and the anchor shot is sequenced after the main shot 62 based upon a predetermined time factor, crank angle or anchor delay 63. In addition, established timing of each shot may be determined bases upon a desired piston position of each shot. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel desired for each fuel shot 60, 62 and 64 and partition the same accordingly, and it will be able to determine the timing and duration of each individual shot as well as the anchor delay 63. In the three shot multiple injection depicted in FIG. 2, a portion of the total fuel to be delivered to the combustion chamber will be injected as the pilot shot 60, a portion of such total fuel will be injected as the main shot 62, and the remaining portion of the total fuel to be injected will be injected as the anchor shot 64. In an alternative embodiment, the prioritization strategy for determining the distribution of fuel among the shots may vary, while maintaining the desired distribution relationships described herein. Under certain engine conditions, a three shot multiple fuel injection has provided advantages in terms of exhaust emissions, including reduced particulate emissions and/or reduced $NO_x$ emissions as well as desired engine performance, as will be hereinafter explained.

FIG. 3 illustrates an example of one embodiment of injection strategies for steady state emissions for a selected engine at certain engine operating conditions based upon engine speed and engine load. The numbers in FIG. 3 are for illustrative purposes only and may change for each engine and rating in a given engine family. As can be seen from FIG. 3, the injection strategies illustrated in FIG. 3 disclose the various multiple injection events including three shot multiple events which will yield desired emissions control as well as desired engine performance at the various engine speeds and engine loads depicted therein. Engine load is the amount of work being performed by the engine at a particular point in time and is generally defined in terms of rated engine load or work capacity. Engine load can be measured by a wide variety of different methods known in the art such as by using the total quantity of fuel delivered to the engine for a particular task or work operation as an indicator of engine load. As noted in FIG. 3, the number of shots, the quantity of fuel associated with each of the first, second and third shots, the timing delay sequence between shots, the rail pressure and the displacement or position of the piston during the compression and power strokes may vary based upon engine speed and engine load.

Referring to FIG. 3 the letters RP represent rail pressure (in units of MPa), the numbers within the boxes represent the fuel quantity associated with that particular fuel shot (in $mm^3$), the numbers below the horizontal line represent the displacement of the piston during a particular stroke (the positive numbers referring to the number of degrees before top dead center (BTDC) and the negative numbers referring to the number of degrees after top dead center (ATDC)), and the number located between and above the second and third shots represents the electronic time delay or anchor delay between the second and third shots. Referring to multiple injection event 66 (FIG. 3) at an engine speed of approximately 1,500 RPM and an engine load of approximately ¾ of rated engine load, the number 21 associated with the first or pilot shot 60 represents 21 cubic millimeters of fuel to be allocated to the pilot shot at a rail pressure of 12.5 MPa (megapascals) during this particular injection event, whereas only six cubic millimeters of fuel are electronically allocated to the second or main shot 62. The third or anchor shot 64 will then receive the remaining amount of total fuel determined for this particular event based upon engine speed, engine load and other parameters. The number 0.42 in injection event 66 represents a 0.42 millisecond delay in current being supplied to the injector solenoid between the second and third shots (anchor delay). The number 47 located below pilot shot 60 indicates that the pilot shot will take place when the cylinder piston is located at or corresponds to approximately 47° before top dead center during the compression stroke. Similarly, the second or main shot will take place when the cylinder piston is located at or corresponds to approximately 3° before top dead center during the compression stroke, and the third or anchor shot will take place when the cylinder piston is located at or corresponds to approximately 7° after top dead center during the power stroke.

Although the pilot advance or main delay between the pilot shot 60 and the main shot 62 is not indicated on the various injection events depicted in FIG. 3, the pilot injection can typically occur anywhere from 3 to 8 milliseconds in advance of the main injection depending upon the main injection timing and engine speed. Alternatively, in one embodiment, the pilot shot may occur early in the compression stroke. As can be seen from a review of the various injection events depicted in FIG. 3, and in particular the three shot injection events, the quantity of fuel partitioned to each individual shot, the rail pressure, the anchor delay, and the angular displacement of the cylinder piston with respect to each individual shot may vary based upon the operating conditions of the engine. All of the injection events depicted in FIG. 3 were determined by an electronically controlled fuel system similar to the system 10 depicted in FIG. 1 and all such injection events produced improved exhaust emissions.

Referring again to FIG. 3, it can be seen that the number of fuel injections may be dynamically reduced during varying speed or load conditions. For example, only two injection shots may be desired at an engine load condition of ¼ of rated engine load to achieve desired exhaust emissions. In this case, the pilot shot has been eliminated and the main shot and anchor shot are sequenced in accordance with the parameters indicated in FIG. 3. For example, referring to injection event 68 which represents a typical injection event for a given engine type at approximately 1800 RPM and an engine load of approximately ¼ of rated engine load, 5.5 cubic millimeters of fuel is allocated to the main shot and the remaining amount of total fuel determined for this particular event will be allocated to the anchor shot. Fuel will be delivered at a rail pressure of 13.5 MPa during this particular injection event and a delay of 0.55 milliseconds in the current being supplied to the injector solenoid or other electrical actuating device will take place between the main and anchor shots. Also, the main shot will occur when the cylinder piston is located at or corresponds to approximately 1° before top dead center during the compression stroke whereas the anchor shot will take place when the cylinder piston is located at or corresponds to approximately 13° after top dead center during the power stroke. Under these particular operating conditions, it is also generally advantageous and desirable for emission purposes to allocate a smaller amount of fuel to the main shot and a larger amount of fuel to the anchor shot. A smaller main shot and a large anchor shot split injection strategy can therefore provide advantages in terms of exhaust emissions, including reduced particulate emissions and/or reduced $NO_x$ emissions at relatively low engine loads without going to a three shot injection event. In fact, it has been found that if a three shot injection is utilized at certain low engine loads, an increase in hydrocarbons (HC) as compared to just a main and anchor shot occurs due to the impingement of the pilot shot onto the cylinder walls. As a result, a split injection method (main and anchor shot only) often times yields better emission results in this engine operating range. The present control system can therefore dynamically adapt to the engine operating conditions and dynamically determine the number of fuel shots, the quantity and placement of each such shot and the other associated injection parameters accordingly.

Although FIG. 3 illustrates an example of the multiple injection events associated with a particular engine and a particular set of electronically controlled fuel injection devices at certain engine operating conditions, it is recognized and anticipated that these injection strategies will vary depending upon the type of engine and fuel injection devices utilized, the type of fuel used, and other parameters. In this regard, it has been found that where a three shot injection event is utilized, in one embodiment, the pilot shot or first injection 60 may occur anywhere from 3 to 8 milliseconds in advance of the main shot or second injection 62, although other time intervals between such fuel shots may be necessary due to engine speed, engine type and other parameters. Depending upon the main injection timing, in one embodiment, the pilot shot will typically take place when the cylinder piston is displaced or located in a range from approximately 35° to approximately 75° before top dead center during the compression stroke. Similarly, in one embodiment, the main injection or second shot 62 will typically occur when the cylinder piston is displaced or located in a range from approximately 30° before top dead center during the compression stroke to approximately 15° after top dead center during the power stroke, and the anchor injection or third shot 64 will typically occur when the cylinder piston is displaced or located in a range from approximately 8° before top dead center during the compression stroke to approximately 18° after top dead center during the power stroke. In like fashion, the anchor injection or shot 64 typically occurs as a fixed delay from the end of the main injection 62. In one embodiment, this delay may be a delay of approximately 0.20 to 0.75 milliseconds. All of these injection parameters are dependent upon engine operating conditions as well as other factors such as engine size and type.

Typically, the pilot injections are approximately 5% to 40% of the total fuel delivered to the injectors during a particular injection event, the main injections are approximately 3% to 40% of the total fuel delivered during a particular injection event, and the anchor injection will include the remaining total fuel to be delivered during a particular injection event. Generally, and in the preferred embodiment, the quantity of fuel associated with the pilot shot is greater than the quantity of fuel associated with the main shot but less than the quantity of fuel associated with the anchor shot. In other words, the main fuel shot generally has the smallest quantity of fuel and the anchor fuel shot generally has the largest quantity of fuel, the quantity of fuel associated with the pilot shot being generally therebetween. For example, at a medium to heavy engine load (¾ to full load) and a generally high engine speed, an exemplary fuel quantity relationship between the respective fuel shots may be such that the pilot shot may have 20% of the fuel, the main shot may have 10% of the fuel, and the anchor shot may have 70% of the fuel. In an alternative embodiment, and in accordance with the fuel quantity relationship discussed above, fuel may be apportioned such that the pilot shot receives approximately 15% to 25% of the total fuel delivered, the main shot receives approximately 5% to 10% of the total fuel delivered, and the anchor shot receives the remaining fuel to be delivered, that is, approximately 60% to 80% of the total fuel delivered. Other distribution ranges are likewise possible wherein the fuel quantity associated with the pilot shot is greater than the fuel quantity associated with the main shot but less than the fuel quantity associated with the anchor shot. Although it is generally desirable to maintain this fuel quantity relationship between the respective fuel shots, it is recognized and anticipated that other fuel quantity relationships may be desired depending upon engine operating conditions, the type of engine and specific fuel injection system being utilized, and other parameters. However, in this regard, if too much fuel is allocated to the pilot shot such as approaching 50% of the fuel, an increase in hydrocarbons (HC) will occur thereby undesirably increasing emissions. However, to achieve the desired compression ignition, the pilot shot should have enough fuel associated therewith for pre-ignition to occur via compression and without the use of a spark or glow plug.

A three shot fuel injection event can be used at typical engine loads of approximately 30% or greater at all engine speeds. Below an engine load of approximately 30%, including idle conditions, typically only main and anchor injections are utilized for the reasons explained above. At all operating conditions depicted in FIG. 3, the multiple injection timings and fuel quantities as well as the delays between multiple injections and the injection pressure are determined for desired emissions and fuel consumption. An oxidation catalyst or deNox catalyst can also be used for hydrocarbon (HC) and carbon monoxide (CO) cleanup to even further improve exhaust emissions.

As fuel and air are compressed during the compression stroke, the compression pressure mixes the fuel and air before combustion or light off. In this regard, based upon the quantity of fuel allocated to the pilot shot, the pilot fuel/air mixture will typically be combusted sometime during the compression stroke. In one embodiment, it has been found that the pilot fuel/air mixture will combust in a compression ignition engine during the compression stroke when the cylinder piston is displaced between a range from approximately 20° to approximately 12° before top dead center independent of when the pilot shot was injected into the cylinder. It is recognized and anticipated that combustion may occur outside of this range due to several factors including the fuel quantity associated with the pilot shot, the rail or injector pressure, air intake, engine speed, engine load and other parameters. The subsequent fuel shots associated with a multiple fuel injection, such as the main and/or anchor shot, may be delivered directly into the flame front of the pilot shot combustion. This can be desirable depending upon engine operating conditions because such fuel will be more thoroughly combustible when injected into the pilot flame front. In addition, depending upon engine operating conditions, it is possible to inject the main shot either before or after the pilot shot combustion.

An exemplary current waveform for a three shot injection event is illustrated in FIG. 4 showing a first or pilot shot control signal 70, a second or main shot control signal 72, a third or anchor shot control signal 74, a main delay signal 76 between the pilot and main shots, and an anchor delay signal 78 between the main and anchor shots. The duration of each of the control signals 70, 72 and 74 can be varied by ECM 56, and the duration of delays 76 and 78 can likewise be controlled by ECM 56. A correlation to the cylinder piston position (angular displacement) relative to top dead center is likewise indicated in the lower portion of FIG. 4. In one embodiment, the timing and duration of the main shot is determined and set by ECM 56 and the timing and duration of the pilot shot and anchor shot are thereafter determined based upon the main shot timing. In this regard, the start of the pilot shot will typically be determined based upon known parameters such as the main shot timing and pilot advance and the anchor shot timing will be just a time delay based upon termination of the main shot. Other methods for determining the various parameters associated with the three fuel injection shots are likewise recognized and anticipated.

FIG. 4 also illustrates the pull-in and hold-in current levels associated with a typical hydraulically actuated electronically controlled fuel injector. When using hydraulically actuated electronically controlled fuel injectors, the injection signal includes generally a two-tier form that includes a pull-in current level and a generally lower hold-in current level. The higher pull-in current is used to quickly open the fuel injector and thereby decrease the response time, that is, the time between the initiation of a fuel injection signal and the time in which fuel actually begins to enter the engine cylinder. Once fuel injection has commenced, a lower level hold-in current can be used to hold the injector open for the remainder of the injection event. The pilot, main and anchor pull-in durations are likewise illustrated in the representative current waveform depicted in FIG. 4. Based upon engine operating conditions, the type of fuel and fuel injectors being utilized, and other parameters, it is recognized and anticipated that the waveform illustrated in FIG. 4 may be modified and altered accordingly. It is also recognized that other mechanisms such as latching valves may be utilized with certain types of fuel injectors wherein different waveforms from that depicted in FIG. 4 will be required and wherein no hold-in current will be necessary.

Under certain operating conditions, the proximity of the main and anchor durations and the resultant internal injector hydraulics may lead to a rate shaping effect of the anchor injection, As a result, a distinct third injection may not always be realized although an injection rate trace would indicate a drop in the injection rate between the main and anchor shots. In this situation, because the main and anchor shots typically occur close together, the duration of the anchor delay may be insufficient to produce a distinct split between the main and anchor shots, that is, a significant reduction in the fuel flow rate between these two fuel shots is not realized. This occurrence is referred to as a boot condition or a boot mode of operation and is also known as rate shaping the anchor fuel shot. A boot type of fuel delivery generates a different quantity of fuel delivered to the cylinder as compared to a distinct split type fuel delivery since in a boot type delivery, the fuel injection flow rate never goes to zero between the respective fuel shots. Conversely, in a split fuel delivery, the fuel injection flow rate may go to zero, between the respective fuel shots. As a result, more fuel is generally delivered in a boot type delivery as compared to a split fuel delivery between the main and anchor fuel shots. Depending upon the operating conditions of the engine, desired engine performance and desired emissions output, and other factors and/or parameters, it may be desirable and advantageous, in certain situations, to deliver the main and anchor fuel shots in a split mode and, in other situations, it may be desirable and advantageous to deliver the main and anchor fuel shots in a boot condition. The present control system is cable of dynamically determining the appropriate parameters associated with a particular multiple fuel injection event to yield either a split or a boot type fuel delivery based upon the particular engine operating conditions.

It is also anticipated, in one embodiment, that the pull-in duration for each shot, the shot duration, the anchor delay, and the pilot and main shot timing with respect to the displacement of the cylinder piston will be determined, calculated, or looked up in respective maps and/or tables as a function of any one or more of the following parameters, namely, engine speed, engine load, rail pressure, total desired fuel quantity, oil or coolant temperature, atmospheric pressure and still other parameters. It is also recognized that other fuel systems will use different current waveforms. The importance of FIG. 4 is the relationship of current waveform to the piston location and injection profile.

Still further, it should be noted that although in one embodiment of the present invention disclosed herein, each separate fuel shot associated with a multiple fuel injection event is delivered or injected into the combustion chamber when the cylinder piston is located or displaced within a predetermined range during the compression and power strokes, it is recognized that each such separate fuel shot can be delivered outside of these ranges due to factors such as the fuel quantity associated with each fuel shot, the injection pressure, engine speed, engine load and other parameters. In this regard, it is recognized that the pilot shot can be injected at any time during the compression stroke; the main shot can be injected at any time during the compression or power stroke after delivery of the pilot shot; and the anchor shot can be injected at any time during the compression or power stroke after delivery of the main shot. In addition, although the present multiple fuel injection events have been discussed in terms of an exemplary waveform such as the exemplary waveform illustrated in FIG. 4 wherein a separate current injection signal or pulse actuates each fuel shot, it is also recognized that a separate pressurization of the actuating fluid may likewise take place for the injection of each fuel shot. In the exemplary fuel injection system 10 illustrated in FIG. 1, a separate pressurization of the actuation fluid in rail 36 (rail pressure) occurs for the injection of each of the pilot, main and/or anchor shots. As a result, the multiple fuel injections associated with a particular fuel injection event can also be defined in terms of the separate fuel injection pressurization events associated therewith.

The actual timing of the fuel injections is implementation dependent. For example, in one embodiment, the third fuel shot, or anchor shot, may occur approximately 0.20 to 0.75 milliseconds after the second fuel shot. However this time delay is implementation dependent and will vary significantly depending on the speed of the engine. For example an engine have a maximum rated engine speed in the low speed range will have different actual injection timing and timing delays, than an engine capable of running at very high speeds, e.g., 4000 rpm and above. Therefore, the timing relationships provided, such as those illustrated in FIG. 3, are provided for exemplary purposes and will vary dependent in part on the engine implementation used.

Industrial Applicability

Utilization of an injection method and system in accordance with the present invention provides for better emission control during varying engine operating conditions as explained above. Although the particular injection waveform for delivering multiple fuel injections may vary depending upon the particular engine operating conditions, the present system is capable of dynamically determining the number of shots to be injected, the timing associated with each individual injection event, the injection duration, any delays between injections, and the displacement of the cylinder piston relative to the beginning of each injection regardless of the type of electronically controlled fuel injectors or digitally controlled valves or common rail fuel system being utilized, regardless of the type of engine being utilized, and regardless of the type of fuel being utilized. In this regard, appropriate fuel maps relating rail pressure, engine speed, engine load, pilot/main/anchor duration times, pilot/main/anchor fuel quantities, anchor timing delays, pilot and main shot timing, and other parameters can be stored or otherwise programmed into ECM 56 for use during all operating conditions of the engine. These operational maps, tables and/or mathematical equations stored in the ECM programmable memory determine and control the various parameters associated with the appropriate multiple injection events to achieve desired emissions control.

It is also recognized that the particular ambient conditions under which the engine will be operating will affect the amount of emissions produced by the engine. As the ambient conditions change, so will the engine exhaust emissions. As a result, the multiple fuel injection events may have to be adjusted in order to keep the engine emissions within desired limits based upon ambient conditions. These adjustments may include adjustments to the pilot injection timing and quantity, the main injection timing and quantity, the delay between the pilot and main injections, and the delay between the main and anchor injections. Ambient conditions can be monitored by providing and coupling appropriate sensors to ECM 56 as will be hereinafter explained.

FIG. 5 is an exemplary schematic diagram showing representative sensor inputs to ECM 56 in order to monitor the ambient conditions under which the engine is operating. For example, appropriate sensors can be positioned and located with respect to a particular engine so as to input appropriate signals 80 and 82 to ECM 56 representative of the ambient temperature and/or pressure under which the engine is currently operating. Based upon the ambient temperature and/or pressure, ECM 56 can select the appropriate maps or lookup tables for that particular ambient condition and thereafter either determine the appropriate parameters for each injection event based upon the existing ambient temperature and/or pressure, or ECM 56 could determine a correction or adjustment factor to be applied to the injection event parameters calculated based upon some normal or nominal operating conditions such as a standard day temperature and pressure. In this regard, the appropriate maps and lookup tables could include a set of such maps and/or lookup tables based upon certain predetermined ambient temperature and/or pressure ranges, a different set of maps and/or tables being applicable to each predetermined range. On the other hand, ECM 56 could likewise include a set of maps and/or lookup tables based upon ambient temperatures and/or pressures which will enable ECM 56 to determine a correction or adjustment factor which can be applied to the various parameters of each injection event, the correction or adjustment factor being scaled with reference to some normal or nominal operating engine conditions. High altitude or cold start conditions are examples of ambient conditions which may affect emissions and may require the ECM 56 to adjust the parameters of the multiple fuel injection events.

As indicated in FIG. 5, based upon a sensor input of ambient temperature 80 and/or ambient pressure 82, ECM 56 would output appropriate signals $S_{10}$ to the fuel injection devices to adjust the desired pilot shot timing and/or fuel quantity (adjustment 92), to adjust the main fuel shot timing and/or fuel quantity (adjustment 94), to adjust the desired delay between the pilot and main fuel shots (adjustment 96), and/or to adjust the desired delay between the main and anchor fuel shots (adjustment 98). Any one or more of these adjustments 92, 94, 96 and 98 may be accomplished by the ECM to achieve the desired pilot, main and anchor fuel shots in order to control exhaust emissions and keep such emissions within certain predetermined limits. In addition, in one embodiment, instead of adjusting the timing or quantity of the shots after an initial distribution determination, one set of fuel distribution maps may be utilized accounting for all the relevant factors, such as speed, load, and ambient conditions.

It is also recognized and anticipated that other parameters or engine operating conditions can likewise be sensed and inputted to ECM 56, other than ambient temperature 80 and/or ambient pressure 82, in order to determine the ambient operating conditions of the engine. For example, ECM 56 could be coupled to a sensor to receive a signal 84 indicative of the inlet manifold temperature associated with the engine, to a sensor to receive a signal 86 indicative of the inlet manifold pressure, to a sensor to receive a signal 88 indicative of the humidity, and/or to a sensor to receive a signal 90 indicative of the crankcase oil pressure. These engine parameters could likewise be correlated or translated through various maps, tables and/or equations to establish the ambient operating conditions of the engine and, based upon any one or a plurality of such signals 80, 82, 84, 86, 88 and 90, ECM 56 could make any one or more of the adjustments 92, 94, 96 and/or 98 and output appropriate signals $S_{10}$ to adjust the parameters of the multiple injection events. All of the sensors providing signals 80, 82, 84, 86, 88 and/or 90 would preferably continuously monitor its corresponding parameter associated with the operation of the engine and each such sensor would output an appropriate signal to ECM 56 indicative of such sensed parameters. Still further, it is recognized and anticipated that other parameters and sensors other than those identified in FIG. 5 such as a coolant temperature sensor, an engine oil temperature sensor, a mass air flow sensor, and/or an exhaust gas sensor could likewise be used to determine the ambient operating conditions of the engine.

Although fuel system 10 illustrated in FIG. 1 has been shown as a representative six injector system, it is recognized that the present invention could be incorporated into fuel injection systems including any number of fuel injectors as well as both hydraulically actuated and mechanically actuated electronically controlled fuel injector units as well as into a fluid activated common rail fuel system. Where mechanically actuated electronically controlled fuel injectors are used, the rail or manifold 36 in FIG. 1 will typically be replaced with a mechanical actuating mechanism for causing each injector to pressurize fuel such as the mechanisms illustrated in U.S. Pat. Nos. 5,947,380 and 5,407,131. Other mechanisms for accomplishing this task are likewise known and available.

As is evident from the forgoing description, certain aspects of the present invention are not limited by the particular details of the examples illustrated herein and it is therefore contemplated that other modifications and applications, or equivalence thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A method for delivering fuel to a cylinder of a compression ignition engine during a particular fuel injection event wherein fuel injection to the cylinder is provided by a fuel injecting device, the method including the steps of:
   sensing an engine speed of the compression ignition engine;
   establishing an engine load of the compression ignition engine;
   dynamically determining the number of fuel injections to be included in the fuel injection event of the compression ignition engine in response to said engine load and said sensed engine speed;
   determining the quantity of fuel associated with each of said fuel injections to be delivered to the compression ignition engine during the particular fuel injection event;
   determining a fuel injection signal indicative of the number of fuel injections to be delivered during the particular fuel injection event; and
   delivering the fuel injection signal to the fuel injecting device of the compression ignition engine.

2. The method as set forth in claim 1 wherein the number of fuel injections to be included in the fuel injection event includes a main fuel injection and an anchor fuel injection.

3. The method as set forth in claim 2 wherein the initiation of the delivery of said anchor fuel shot occurs within approximately 50° of cylinder piston displacement after initiation of the delivery of the main fuel injection during a particular piston stroke.

4. The method as set forth in claim 2 wherein the quantity of fuel associated with said anchor fuel injection is greater than the quantity of fuel associated with said main fuel injection.

5. The method as set forth in claim 2 wherein said number of fuel injections to be included in the fuel injection event includes a pilot fuel injection, the initiation of the delivery of the pilot fuel injection occurring prior to initiation of the delivery of the main fuel injection.

6. The method as set forth in claim 5 wherein the quantity of fuel associated with said pilot fuel injection is greater than the quantity of fuel associated with said main fuel injection but less than the quantity of fuel associated with said anchor fuel injection.

7. The method as set forth in claim 2 wherein the initiation of the delivery of the main fuel injection occurs when the cylinder piston is displaced between a range from approximately 30° before top dead center to approximately 15° after top dead center during a particular piston stroke.

8. The method as set forth in claim 2 wherein the initiation of the delivery of the anchor fuel injection occurs when the cylinder piston is displaced between a range from approximately 8° before top dead center to approximately 18° after top dead center during a particular piston stroke.

9. The method as set forth in claim 5 wherein the initiation of the delivery of the pilot fuel injection occurs when the cylinder piston is displaced between a range from approximately 75° to approximately 35° before top dead center during a particular piston stroke.

10. The method as set forth in claim 1 wherein the number of fuel injections to be included in the fuel injection event includes a first, a second, and a third fuel injection, the initiation of the delivery of said first fuel injection occurring during the compression stroke.

11. The method as set forth in claim 10 wherein the initiation of the delivery of said first fuel injection occurs when the cylinder piston is positioned between a range from approximately 75° to approximately 35° before top dead center during a compression stroke.

12. The method as set forth in claim 11 wherein the initiation of the delivery of said second fuel injection occurs when the cylinder piston is positioned between a range from approximately 30° before top dead center to approximately 15° after top dead center during a compression stroke.

13. The method as set forth in claim 12 wherein the initiation of the delivery of said third fuel injection occurs when the cylinder piston is positioned between a range from approximately 8° before top dead center to approximately 18° after top dead center during a compression stroke.

14. The method as set forth in claim 10 wherein the quantity of fuel associated with said first fuel injection is greater than the quantity of fuel associated with said second fuel injection but less than the quantity of fuel associated with said third fuel injection.

15. The method as set forth in claim 1 wherein the fuel injecting device is an electronically controlled fuel injector.

16. The method as set forth in claim 15 wherein said electronically controlled fuel injector is a hydraulically actuated fuel injector.

17. The method as set forth in claim 15 wherein said electronically controlled fuel injector is a mechanically actuated fuel injector.

18. A method for delivering a first, second and third fuel shot to a cylinder of a compression ignition engine during a particular fuel injection event wherein fuel injection to the cylinder is provided by a fuel injecting device, the method comprising the steps of:

sensing an engine speed of the compression ignition engine;

establishing an engine load of the compression ignition engine;

determining a total fuel quantity to be delivered to the compression ignition engine during injection as a function of at least the sensed engine speed and the engine load; and apportioning the total fuel quantity to be delivered to the compression ignition engine during injection such that the first shot fuel quantity is greater than the second shot fuel quantity but less than the third shot fuel quantity.

19. The method as set forth in claim 18 including the steps of:

determining a fuel injection signal indicative of the first, second and third fuel shots to be delivered during the particular fuel injection event; and delivering the fuel injection signal to the fuel injecting device.

20. The method as set forth in claim 18 including the step of:

initiating the delivery of the first fuel shot when the cylinder piston is displaced before approximately 90° before top dead center during the compression stroke.

21. The method as set forth in claim 18 including the step of:

initiating the delivery of the first fuel shot when the cylinder piston is displaced after approximately 90° before top dead center during a compression stroke.

* * * * *